Jan. 19, 1926.
O. M. JACKSON
1,570,493
STEERING GEAR
Filed May 14, 1923
3 Sheets-Sheet 1

O. M. Jackson INVENTOR
BY Victor J. Evans
ATTORNEY

WITNESSES

Jan. 19, 1926. 1,570,493
O. M. JACKSON
STEERING GEAR
Filed May 14, 1923  3 Sheets-Sheet 2
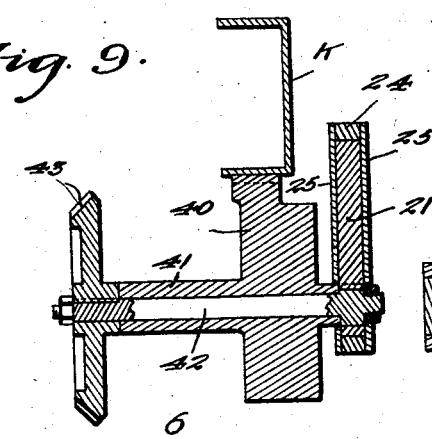
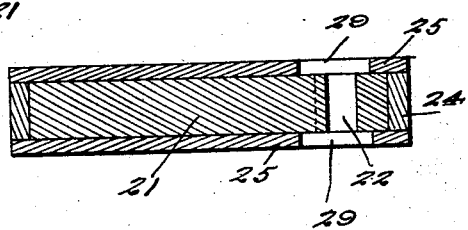
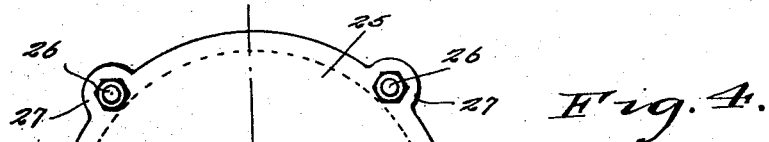
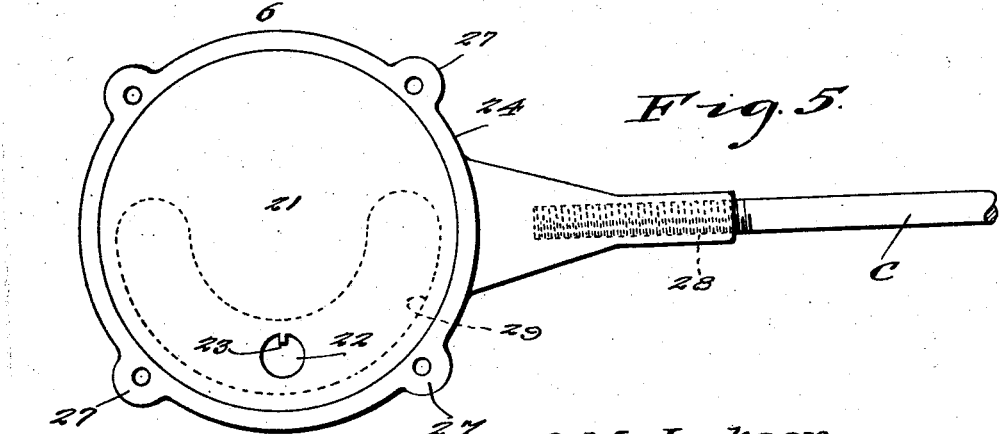

Jan. 19, 1926.
O. M. JACKSON
1,570,493
STEERING GEAR
Filed May 14, 1923        3 Sheets-Sheet 3
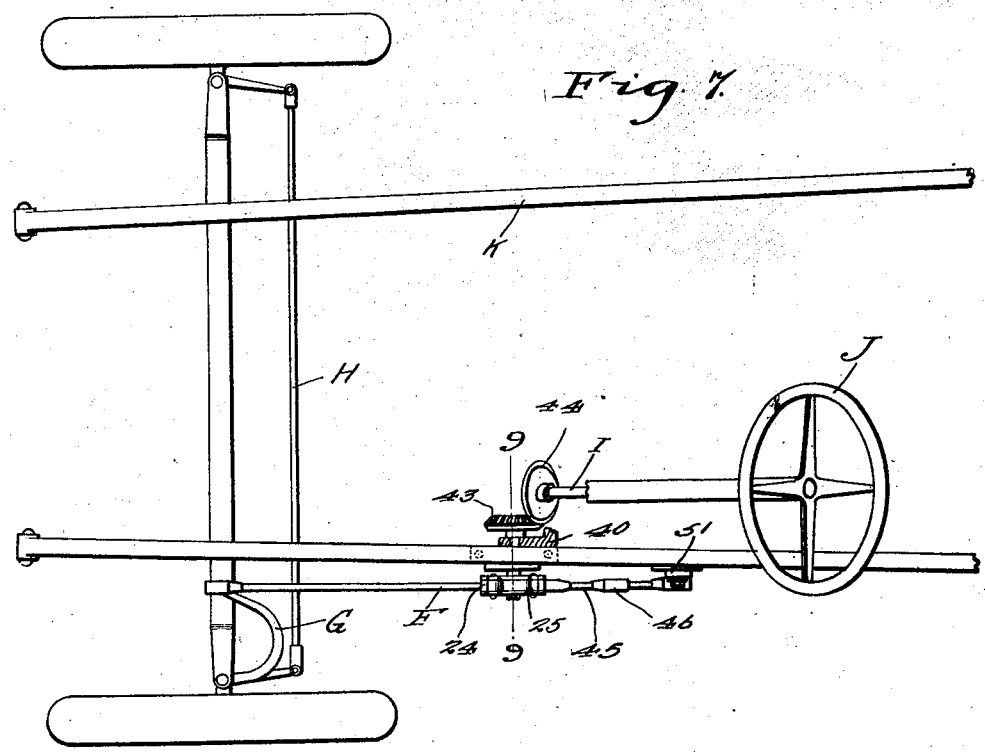
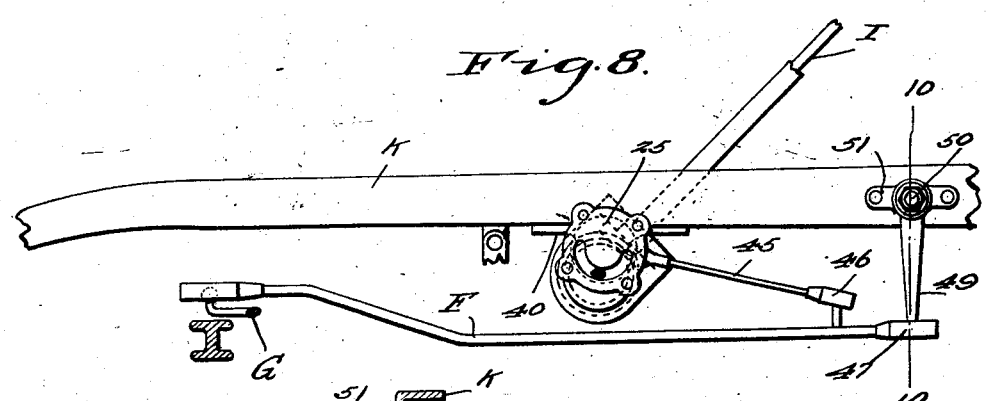
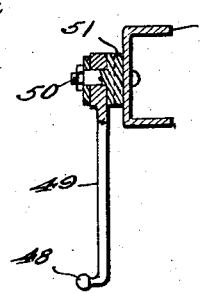

Patented Jan. 19, 1926.

1,570,493

UNITED STATES PATENT OFFICE.

OVID M. JACKSON, OF JACKSON, MICHIGAN.

STEERING GEAR.

Application filed May 14, 1923. Serial No. 638,986.

*To all whom it may concern:*

Be it known that I, OVID M. JACKSON, a citizen of the United States, residing at Jackson, in the county of Jackson and State of Michigan, have invented new and useful Improvements in Steering Gears, of which the following is a specification.

This invention relates to steering mechanism for motor vehicles and has for its object the provision of a novel eccentrically operated means for effecting steering, whereby use of the well known different types of gear connections and direct connections will be eliminated, while at the same time steering may be effected more easily than with the ordinary construction and with an absence of the usual troublesome, fatiguing and annoying lost motion which develops after some use of the ordinary types of steering gears.

An important and more specific object is the provision of a steering mechanism including a disk eccentrically mounted upon the steering post or rod and operating within a shell connected with the connecting rod or steering arm as the case may be.

An additional object is the provision of a device of this character which will be simple and inexpensive in manufacture, easy to install, efficient and durable in use and a general improvement in the art.

Figure 1:
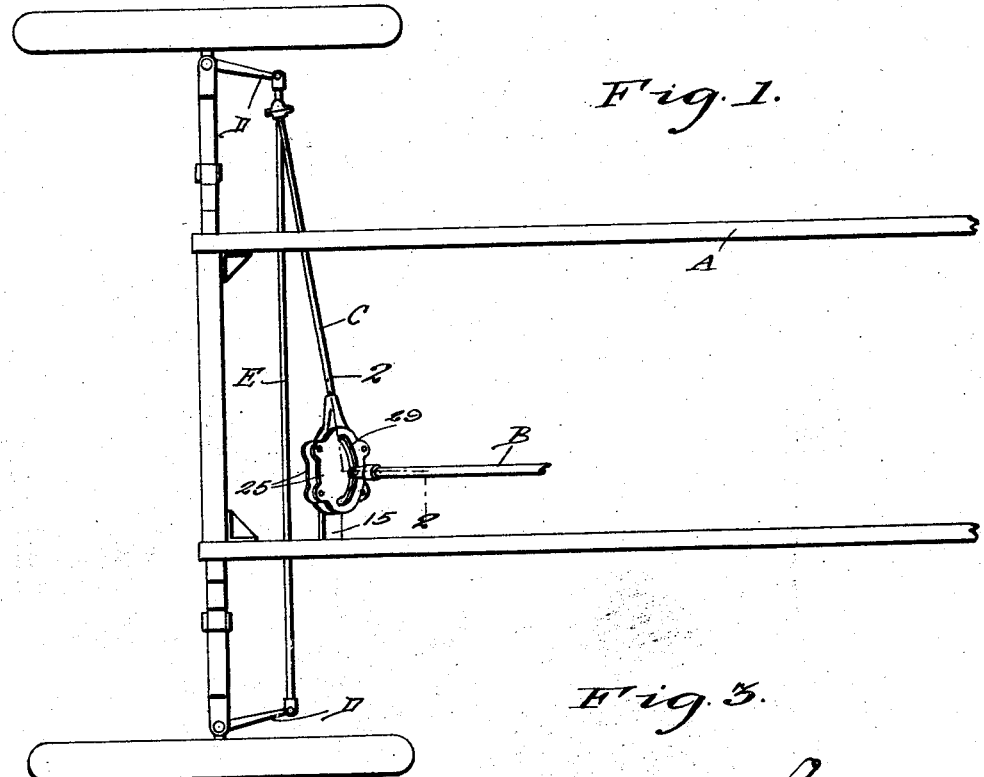
Figure 3:
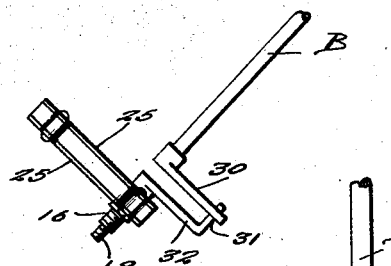
Figure 2:
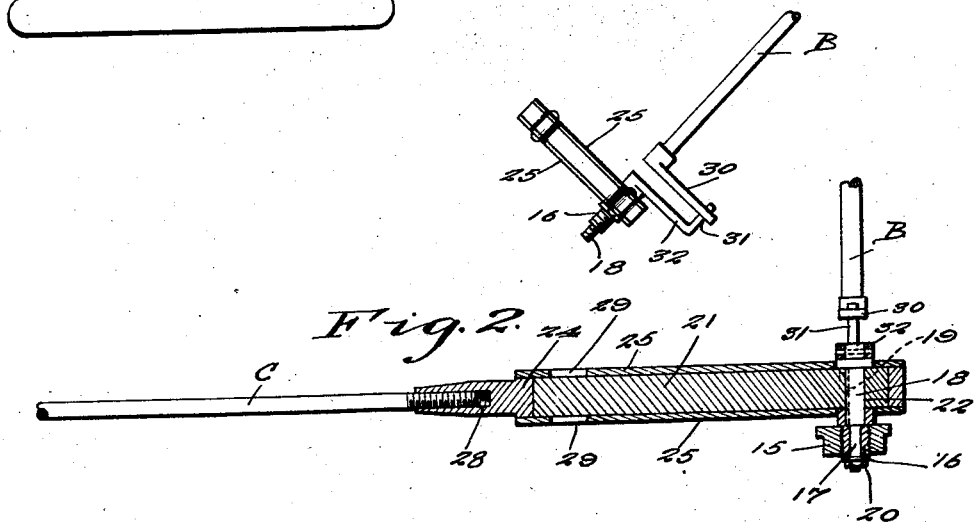

With the above and other objects and advantages in view the invention consists in the details of construction to be hereinafter more fully described and claimed and illustrated in the accompanying drawings, in which:

Figure 1 is a plan view of a portion of the chassis of an automobile of the Ford type showing my steering device mounted thereon, Figure 2 is a section on the line 2—2 of Figure 1, Figure 3 is a detail side elevation showing the connection of the ordinary steering post with my device, Figure 4 is an enlarged face view of my device removed, Figure 5 is a similar view thereof with the cover plate removed, Figure 6 is a cross section on the line 6—6 of Figure 4, Figure 7 is a plan view of the chassis of an automobile of that type having gear driving steering means and showing my device applied thereto, Figure 8 is a side elevation of this structure, Figure 9 is a cross section on the line 9—9 of Figure 7, Figure 10 is a detail section on the line 10—10 of Figure 8.

Referring more particularly to the drawings the letter A designates the frame of a chassis of the Ford type or that type in which use is made of steering which includes a rotatable post B directly connected with a connecting rod C which is in turn connected with one of the steering arms D. Both arms are of course connected by a connecting rod E.

In applying my invention to this type of machine, I provide a bracket 15 which is suitably secured at one side of the frame and which is formed with a threaded hole receiving a bushing 16 through which is journaled the reduced end 17 of a short shaft member 18 formed with a key way 19. The bushing 16 is counter-bored to receive the extension and shaft member and the shoulder thus defined prevents longitudinal movement of the shaft member 18 in one direction, movement in the other direction being prevented by a suitable nut 20 screwed onto the threaded extremity of the reduced extension.

Carried by the intermediate portion of the shaft 18 is a disk 21 which is circular in shape and which is formed off center with a hole 22 receiving the shaft and projecting into this hole is a key 23 fitting within the key way 19 in the shaft member 18. The disk 21 is rotatable within a housing consisting of a ring 24 upon opposite sides of which are cover plates 25. The ring and cover plates are secured together by suitable bolts 26 which pass through ears 27. Formed on the ring is a socket 28 into which is screwed the threaded end of the connecting rod C. The plates 25 are formed with arcuate slots 29 which register with the hole 22 and which are for a purpose to be described.

The actuating arm ordinarily provided upon the steering post is removed and replaced by an arm 30 formed with a hole which receives a lateral finger 31 on a crank arm 32 which is keyed or otherwise rigidly secured upon the free end of the shaft member 18.

In the operation of this form of the device it will be seen that when the steering post is turned in the usual manner the arm 30 carried thereby engaging the finger 31 on the arm 32 will cause rotation of the shaft member 18 and rotation of the disk 21 keyed to the shaft. As the point of securing the shaft within the disk is eccentrical of the latter it is quite apparent that the rotary movement of the disk will cause the housing or shell formed by the parts 24 and 25 to move laterally with respect to the frame of the machine so that the steering rod C will be moved longitudinally to effect turning of the front wheels of the vehicle.

In Figures 7 to 10 I have shown my device used in connection with that type of vehicle in which steering is effected by means of a longitudinally movable rod F connected with the steering arm G carried by one of the spindles, both spindles being connected for simultaneous movement by the usual steering rod connecting arm H. Vehicles of this type are equipped with a steering post I carrying a steering wheel J and also carrying some type of worm or gear connection for moving the rod F.

In adapting my invention to this type of vehicle, I provide a bracket 40 suitably secured to one of the frame bars K and formed with a bearing 41 through which is journaled a shaft 42 upon one end of which is secured a bevel gear 43 meshing with a bevel gear 44 on the steering post I. Keyed on the other end of this shaft 42 is the disk 21 operating within the housing or shell formed by the side plates 25 and ring 24 the construction being identically the same as in the above described form except for the mounting. Instead of having the steering rod directly connected in the socket 28 I provide an intermediate rod 45 which has one end screwed into this socket and which has its other end provided with a conventional ball and socket connection 46 on the rod F. The rear end of the rod F is supported by being provided with a socket member 47 engaging upon a ball head 48 formed on a crank arm 49 which is pivoted at 50 on a bracket 51 secured to the frame bar K. The purpose of this arm 49 is merely to support the rear end of the rod F at all times regardless of the degree of movement.

In the operation of this form it will be seen that when the steering post is turned by means of the steering wheel the gear 44 will rotate the gear 43 and disk 21. Owing to the eccentric mounting of this disk upon its shaft 42 it is apparent that the disk will exert a cam or eccentric action on its shell so that the rod F may be moved lengthwise to accomplish steering of the vehicle.

From the foregoing description and a study of the drawings it will be apparent that I have thus provided a simply constructed and consequently inexpensive steering gear which will be easy to install and which has proved to be extremely efficient inasmuch as steering is easily accomplished without fatigue and nerve strain especially owing to the fact that ordinary obstructions such as ruts, sand and the like have no effect upon the front wheels.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

The combination with a vehicle frame and a transversely shiftable steering gear bar, of a bracket secured to the frame and provided with an opening, a bushing threaded in the opening, a shaft rotatably supported in the bushing, a disc mounted on the shaft to rotate therewith the shaft having its upper end projecting above the disc, an annulus encircling the disc and adapted to be shifted by the latter, an operative connection between the annulus and transversely shiftable steering gear bar, a crank shaft carried by the upper end of the shaft and including an upstanding arm, a steering gear post, laterally extending arms carried by the lower end thereof and provided with an opening which receives the upper end of the upstanding arm, and a nut threaded upon the lower end of the first mentioned shaft.

In testimony whereof I affix my signature.

OVID M. JACKSON.